W. P. CANNING.
METHOD AND APPARATUS FOR FORMING CUTTING TOOLS.
APPLICATION FILED JULY 1, 1916.
1,224,273.
Patented May 1, 1917.
2 SHEETS—SHEET 1.
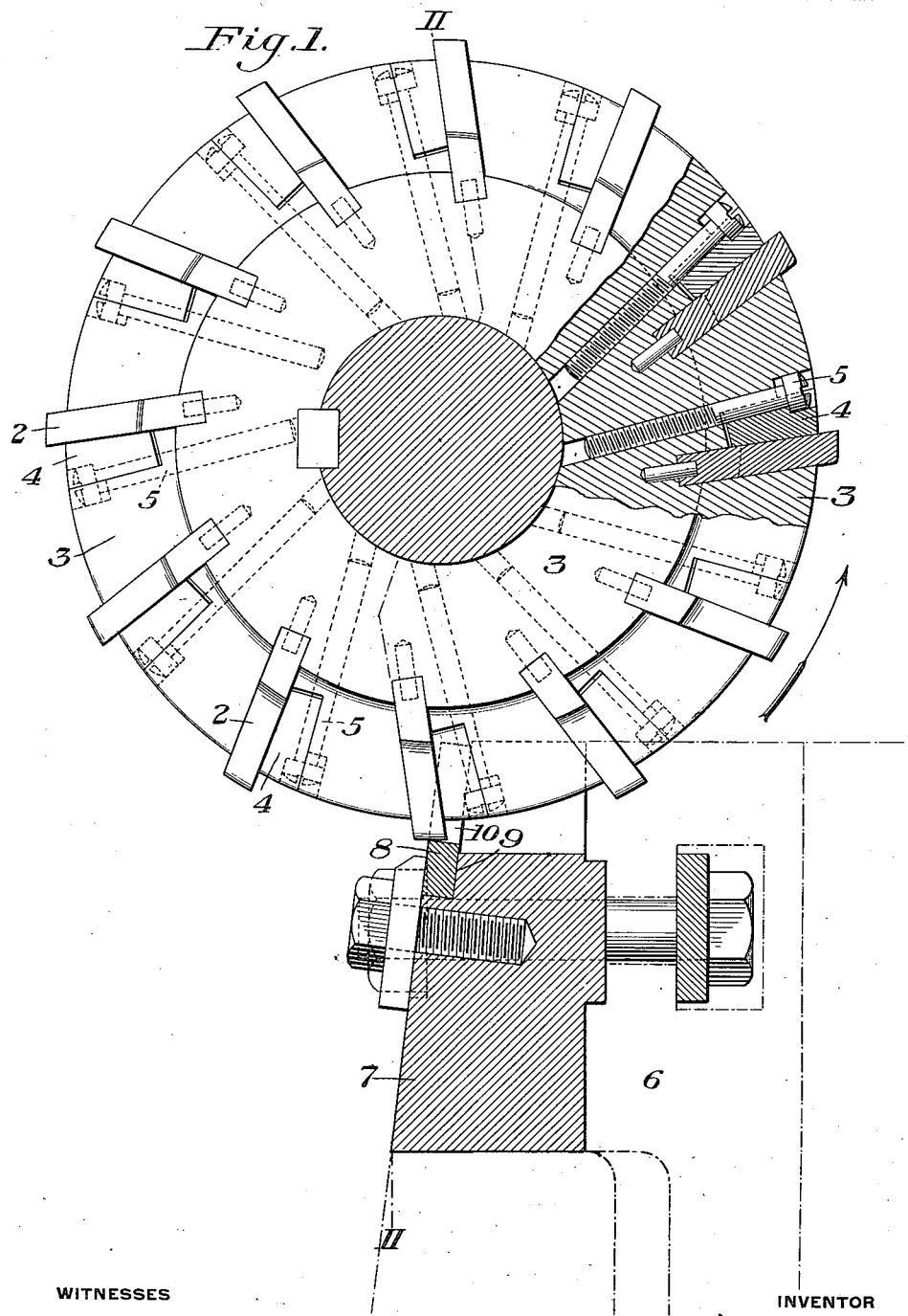
WITNESSES
INVENTOR W. P. CANNING.
METHOD AND APPARATUS FOR FORMING CUTTING TOOLS.
APPLICATION FILED JULY 1, 1916.
1,224,273.
Patented May 1, 1917.
2 SHEETS—SHEET 2.
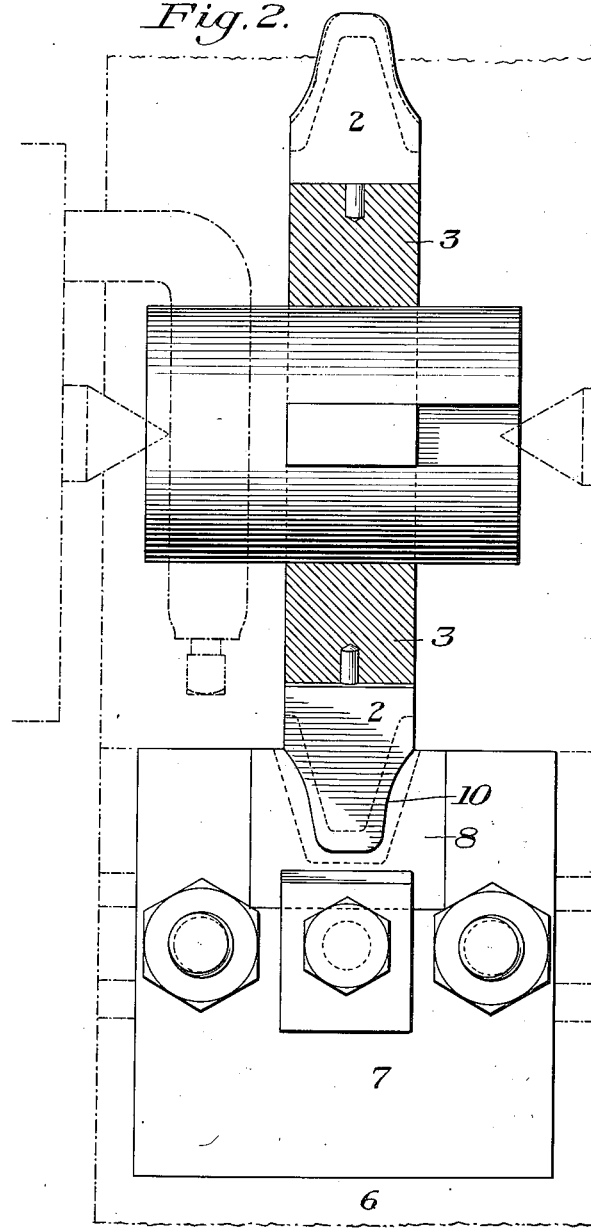
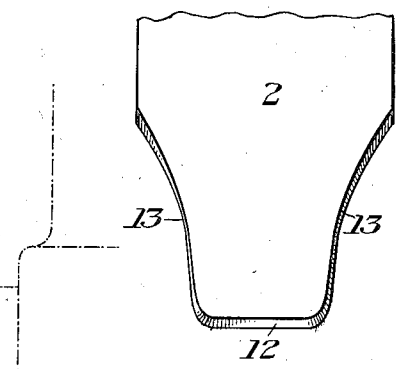
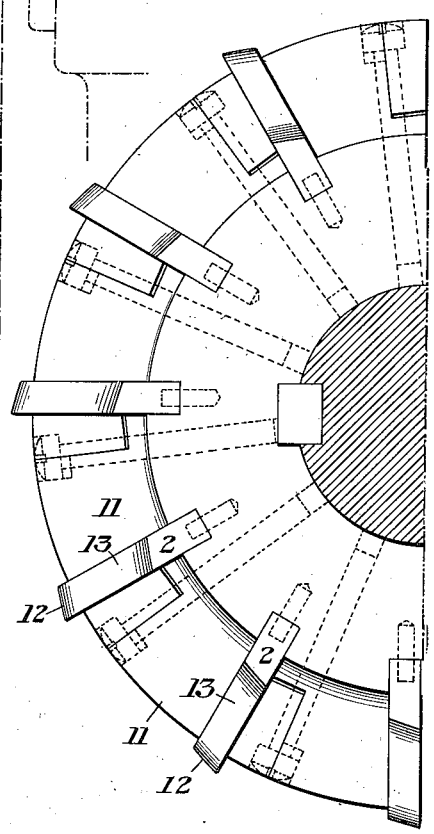
WITNESSES
INVENTOR

UNITED STATES PATENT OFFICE.

WILLIAM P. CANNING, OF PITTSBURGH, PENNSYLVANIA, ASSIGNOR TO UNITED ENGINEERING AND FOUNDRY COMPANY, OF PITTSBURGH, PENNSYLVANIA, A CORPORATION OF PENNSYLVANIA.

METHOD AND APPARATUS FOR FORMING CUTTING-TOOLS.

1,224,273. Specification of Letters Patent. Patented May 1, 1917.

Application filed July 1, 1916. Serial No. 107,168.

*To all whom it may concern:*

Be it known that I, WILLIAM P. CANNING, a citizen of the United States, residing at Pittsburgh, Allegheny county, Pennsylvania, have invented a new and useful Improvement in Methods and Apparatus for Forming Cutting-Tools, of which the following is a full, clear, and exact description, reference being had to the accompanying drawings, forming part of this specification, in which—

Figures 1 and 2 are views partly in elevation and partly in vertical section showing one form of apparatus for carrying out my invention, the two views being taken in planes at substantially right angles to each other.

Fig. 3 is a view in elevation of a portion of a cutter wheel having therein tooth cutters formed in accordance with my invention, and Fig. 4 is a detail view showing a portion of one of the finished cutters.

My invention has relation to the manufacture of cutting tools, such as milling cutters, turning and planing tools, and is designed to provide a method and apparatus by means of which such cutters may be shaped and provided with the proper backing off or clearance simultaneously with the forming operation and without the necessity for separate operations therefor.

My invention will be best understood by reference to the accompanying drawings, which will now be described, it being premised, however, that the invention is susceptible to various modifications within the scope of the appended claims.

In these drawings I have shown my invention as applied to the making of milling cutters in the form of teeth adapted to be inserted in a cutter wheel.

In accordance with my invention I first provide blanks 2 of suitable stock, and place a plurality of these blanks in a rotary carrier 3 which may be substantially similar in form to the cutter wheel in which the cutters are to be subsequently used. The sockets of this carrier wheel 3, however, instead of being formed in radial relation to the center of the wheel are formed non-radially, or tangentially, as shown in Fig. 1. The blanks may be secured in the sockets of the wheel 3 by any suitable clamping means, such as the wedges 4 held by the screws 5. The carrier wheel is then placed on the spindle of an ordinary lathe, as indicated in Fig. 2. I provide the tool rest or slide 6 of the lathe with a holder 7 for a shaping tool 8. This holder 7 is made removable and interchangeable, and is provided with a seat 9 for the tool 8 adapted to hold said tool at an oblique angle. The obliquity of this angle is equal to the obliquity of the angle at which the cutter blanks 2 are held in the carrier 3 with respect to the radii of said wheel, but the inclination is in the reverse direction, as will clearly appear from Fig. 1. The tool 8 is provided with the shaping cavity 10 corresponding to the profile of the cutter to be formed.

The carrier 3 with the blanks is then rotated in the direction indicated by the arrow in Fig. 1, the tool slide of the lathe being in the meanwhile gradually fed in. It will be readily seen that as the blanks are shaped they are at the same time cut in such a manner that when subsequently placed radially in a cutter wheel 11 (Fig. 3) they will have the end clearance 12 and the side clearances 13, without the necessity for special backing off operations. Before placing the cutter blanks in the carrier 3, they may be roughed down in a lathe to the approximate size.

By seating the shaping tool 8 at an oblique angle in the manner described, it will be readily seen that it is unnecessary to provide the cutting edges of this tool with any backing off or clearance, and that it may be given the exact contour of the cutter to be formed. However, a specially shaped tool having proper backing-off and set in a radial position might be used.

The advantages of my invention will be apparent to those skilled in the art, since it provides an extremely simple method and means of forming milling and other cutters, and by which any number of cutters of the same shape can be accurately made with the same backing-off. By changing the angle of inclination of the shaping tools, any desired degree of backing off or clearance can be provided simultaneously with the shaping operation. While my invention may be carried out on an ordinary lathe, it is obvious that it may be embodied in special machines for the purpose. The invention is also susceptible of various other modifications with respect to the character of the carrier for the blanks; the holder for the shaping tool, and with respect to the means for providing relative cutting and feeding movements between the tool and the blanks.

I claim:

1. The herein described method of making a rotary cutter, which consists in holding a blank with its longitudinal axis oblique to the direction of such axis in a finished tool when in a cutting position, and subjecting the blank while so held to the action of a forming tool and then securing the cutting tool thus formed in a rotary cutter carrier with the longitudinal axis of the cutting tool at a different angle from that of the blank during the forming operation, substantially as described.

2. The herein described method of making a rotary cutter, which consists in holding a blank having substantially parallel front and rear side edges in a holder in a position in which both its parallel side edges are in non-radial relation to the axis of said holder, subjecting the blank while so held to the action of a forming tool, and then securing the tool so formed in a cutter holder in a position in which one of said parallel edges is in radial relation to the axis of said holder, substantially as described.

3. The herein described method of making cutting tools, which consists in setting a suitable blank in a carrier or support in non-radial relation to the axis of the carrier or support, and in operative relation to a cutting tool which is set at a correspondingly oblique but reverse angle, and then rotating the carrier or support and blank to the action of said forming tool, substantially as described.

4. The herein described method of making cutting tools, which consists in inserting a plurality of cutter forming blanks in a rotatable carrier in non-radial relation to the axis of said carrier, and in operative relation to a shaping tool held in a reverse oblique position, and then rotating the carrier to bring the several blanks to the action of said shaping tool, substantially as described.

5. Apparatus for forming cutting tools, comprising a rotatable carrier having means for holding a tool blank in non-radial relation to the center thereof, and a tool holder having means for holding a shaping tool in a reverse oblique position, substantially as described.

6. Apparatus for forming cutting tools, comprising a rotary carrier having blank seats therein in non-radial relation to the axis of the carrier, and a shaping tool holder arranged to support the shaping tool at an oblique angle, said holder and tool being removable and interchangeable, substantially as described.

7. Apparatus for forming cutting tools, comprising a rotatable carrier having a plurality of blank seats which are in non-radial relation to the center of the carrier, means for removably clamping tool blanks in said seats, a relatively fixed shaping tool holder having means for holding the shaping tool in non-radial relation to the axis of said rotatable carrier and at an inclination which is the reverse of that of the blanks, and means for rotating said carrier to bring the blanks successively to the action of such tool, substantially as described.

In testimony whereof, I have hereunto set my hand.

WILLIAM P. CANNING.

Witnesses:
JOHN J. SWINBANK,
GEORGE VETTER, Jr.